(12) United States Patent
Okita et al.

(10) Patent No.: US 11,099,550 B2
(45) Date of Patent: Aug. 24, 2021

(54) FAILURE LOCATION SPECIFYING DEVICE, FAILURE LOCATION SPECIFYING METHOD, AND FAILURE LOCATION SPECIFYING PROGRAM

(71) Applicant: FANUC CORPORATION, Yamanashi (JP)

(72) Inventors: Tadashi Okita, Yamanashi (JP); Norinaga Mutai, Yamanashi (JP); Masao Kamiguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 147 days.

(21) Appl. No.: 16/233,430

(22) Filed: Dec. 27, 2018

(65) Prior Publication Data

US 2019/0243351 A1 Aug. 8, 2019

(30) Foreign Application Priority Data

Feb. 8, 2018 (JP) .............................. JP2018-020741

(51) Int. Cl.
*G05B 23/02* (2006.01)
*G01M 13/00* (2019.01)
*G05B 19/406* (2006.01)

(52) U.S. Cl.
CPC ......... *G05B 23/0275* (2013.01); *G01M 13/00* (2013.01); *G05B 19/406* (2013.01); *G05B 23/0264* (2013.01)

(58) Field of Classification Search
CPC .............. G05B 23/0275; G05B 19/406; G05B 23/0264; G05B 19/058; G01M 13/00
(Continued)

(56) References Cited

U.S. PATENT DOCUMENTS 5,557,549 A 9/1996 Chang
10,838,394 B2 * 11/2020 Kamiguchi ........ G05B 19/4184
(Continued)

FOREIGN PATENT DOCUMENTS

CN 105531680 4/2016
JP 5-314182 11/1993
(Continued)

OTHER PUBLICATIONS

English translation of JP 2010166686. (Year: 2010).*
(Continued)

*Primary Examiner* — Michael P Nghiem
(74) *Attorney, Agent, or Firm* — Wenderoth, Lind & Ponack, L.L.P.

(57) ABSTRACT

A failure location specifying device, a failure location specifying method, and a failure location specifying program capable of specifying locations of various failures occurring in a mechanism unit of a machine efficiently are provided. A failure location specifying device includes: a failure history database that stores a specific frequency band occurring resulting from a failure of a machine in correlation with at least an event code indicating a location of the failure; an input unit that receives data related to vibration during operation of the machine as an input; and an output unit that matches the specific frequency band to a frequency included in the data related to vibration to specify the location of the failure and outputs the event code.

10 Claims, 11 Drawing Sheets

(58) Field of Classification Search
USPC .......................................................... 702/183
See application file for complete search history.

(56) References Cited

U.S. PATENT DOCUMENTS

| | | | |
|---|---|---|---|
| 2005/0028045 A1 | 2/2005 | Kawaike | |
| 2005/0283638 A1* | 12/2005 | Kato | G06F 11/0706 714/2 |
| 2006/0271339 A1 | 11/2006 | Fukada | |
| 2008/0034258 A1 | 2/2008 | Moriya et al. | |
| 2008/0215292 A1* | 9/2008 | Kato | G01M 13/021 702/183 |
| 2010/0177359 A1 | 7/2010 | Miyazaki et al. | |
| 2012/0036405 A1 | 2/2012 | Iizuka | |
| 2013/0339810 A1* | 12/2013 | Shimizu | G06F 11/324 714/57 |
| 2014/0214363 A1* | 7/2014 | Hatch | G05B 19/4065 702/181 |
| 2017/0075743 A1 | 3/2017 | Zhu et al. | |
| 2017/0269985 A1 | 9/2017 | Xiao et al. | |
| 2018/0137008 A1 | 5/2018 | Maeda et al. | |
| 2018/0137129 A1 | 5/2018 | Matsuo et al. | |
| 2018/0137377 A1 | 5/2018 | Nishida et al. | |
| 2018/0275639 A1 | 9/2018 | Shinoda et al. | |
| 2019/0108692 A1* | 4/2019 | Du | G07C 5/0808 |
| 2019/0243332 A1* | 8/2019 | Kamiguchi | G06F 11/008 |
| 2019/0243351 A1 | 8/2019 | Okita et al. | |
| 2019/0323882 A1* | 10/2019 | Sinharay | G01S 13/867 |

FOREIGN PATENT DOCUMENTS

| | | | |
|---|---|---|---|
| JP | 2003-271212 | | 9/2003 |
| JP | 2007-109056 | | 4/2007 |
| JP | 2008-32477 | | 2/2008 |
| JP | 2008-90682 | | 4/2008 |
| JP | 4112594 | | 4/2008 |
| JP | 2010166686 | * | 7/2010 |
| JP | 2015-36962 | | 2/2015 |
| JP | 2016-64474 | | 4/2016 |
| WO | 2014/061604 | | 4/2014 |
| WO | 2017/175378 | | 10/2017 |

OTHER PUBLICATIONS

Office Action dated May 22, 2020 in U.S. Appl. No. 16/241,428.
English translation of JP2598693B2, published Apr. 1997.
English translation of JP2018190366A, published Nov. 2018.
English translation of JPH05-150818A, published Jun. 1993.
Office Action dated Feb. 14, 2020 in U.S. Appl. No. 16/241,428.

* cited by examiner

| NUMBER | CNC ALARM | FAILURE EVENT | COUNTERMEASURE PART |
|---|---|---|---|
| 1 | NONE | GRINDING SOUND IS GENERATED FROM TABLE | PT002 |
| 2 | NONE | RUMBLING SOUND IS GENERATED WHEN TABLE MOVES | PB003 |
| 3 | NONE | MOVEMENT OF TABLE IS POOR | PT003 |
| 4 | NONE | MACHINING ACCURACY BECAME POOR | PB001 |
| 5 | ALM10 | OVERLOAD ALARM IS GENERATED | PC001 |
| 6 | ALM20 | OVERCURRENT ALARM IS GENERATED | PM001 |
| 7 | NONE | GRINDING SOUND IS GENERATED FROM TABLE | PT002 |
| 8 | NONE | BACKLASH INCREASED AND MACHINING ACCURACY DETERIORATED | PB001 |
| 9 | NONE | RUMBLING SOUND IS GENERATED DURING MACHINING | PB003 |
| 10 | ALM10 | OVERLOAD ALARM IS GENERATED | PC001 |
| 11 | ALM20 | ABNORMAL SOUND IS GENERATED FROM MOTOR AND OVERCURRENT ALARM IS GENERATED | PM001 |
| ... | ... | ... | ... |
| N | NONE | MACHINING ACCURACY DETERIORATED | PB001 |

FIG. 5

| EVENT CODE | EVENT MESSAGE | PART NAME | PART NUMBER |
|---|---|---|---|
| M001 | MOTOR FAILURE MAY BE THE CAUSE. PLEASE CHECK MOTOR. | MOTOR | PM001 |
| | | PULSE CODER | PM002 |
| C001 | JOINT FAILURE MAY BE THE CAUSE. PLEASE CHECK JOINT. | JOINT | PC001 |
| B001 | WEARING OF BALL SCREW MAY BE THE CAUSE. PLEASE CHECK GREASING STATE AND BALL SCREW STATE. | BALL SCREW | PB001 |
| | | BALL NUT | PB002 |
| | | BEARING A | PB003 |
| | | BEARING B | PB004 |
| | | GREASING SITE B | PB005 |
| T001 | WEARING OF LM GUIDE MAY BE THE CAUSE. PLEASE CHECK GREASING STATE AND LM GUIDE STATE. | TABLE | PT001 |
| | | LM GUIDE | PT002 |
| | | GREASING SITE A1 | PT003 |
| | | GREASING SITE A2 | PT004 |

FIG. 6

| NUMBER | EVENT CODE | CNC ALARM | FAILURE EVENT | COUNTERMEASURE PART |
|---|---|---|---|---|
| 1 | T001 | NONE | GRINDING SOUND IS GENERATED FROM TABLE | PT002 |
| 2 | B001 | NONE | RUMBLING SOUND IS GENERATED WHEN TABLE MOVES | PB003 |
| 3 | T001 | NONE | MOVEMENT OF TABLE IS POOR | PT003 |
| 4 | B001 | NONE | MACHINING ACCURACY BECAME POOR | PB001 |
| 5 | C001 | ALM10 | OVERLOAD ALARM IS GENERATED | PC001 |
| 6 | M001 | ALM20 | OVERCURRENT ALARM IS GENERATED | PM001 |
| 7 | T001 | NONE | GRINDING SOUND IS GENERATED FROM TABLE | PT002 |
| 8 | B001 | NONE | BACKLASH INCREASED AND MACHINING ACCURACY DETERIORATED | PB001 |
| 9 | B001 | NONE | RUMBLING SOUND IS GENERATED DURING MACHINING | PB003 |
| 10 | C001 | ALM10 | OVERLOAD ALARM IS GENERATED | PC001 |
| 11 | M001 | ALM20 | ABNORMAL SOUND IS GENERATED FROM MOTOR AND OVERCURRENT ALARM IS GENERATED | PM001 |
| ... | ... | ... | ... | ... |
| N | B001 | NONE | MACHINING ACCURACY DETERIORATED | PB001 |

FIG. 7

| NUMBER | EVENT CODE | CNC ALARM | FAILURE EVENT | COUNTERMEASURE PART |
|---|---|---|---|---|
| 1 | T001 | NONE | GRINDING SOUND IS GENERATED FROM TABLE | PT002 |
| 2 | T001 | NONE | MOVEMENT OF TABLE IS POOR | PT003 |
| 3 | T001 | NONE | GRINDING SOUND IS GENERATED FROM TABLE | PT002 |
| 4 | B001 | NONE | MACHINING ACCURACY BECAME POOR | PB001 |
| 5 | B001 | NONE | RUMBLING SOUND IS GENERATED WHEN TABLE MOVES | PB003 |
| 6 | B001 | NONE | BACKLASH INCREASED AND MACHINING ACCURACY DETERIORATED | PB001 |
| 7 | B001 | NONE | RUMBLING SOUND IS GENERATED DURING MACHINING | PB003 |
| 8 | B001 | NONE | MACHINING ACCURACY DETERIORATED | PB001 |
| 9 | C001 | ALM10 | OVERLOAD ALARM IS GENERATED | PC001 |
| 10 | C001 | ALM10 | OVERLOAD ALARM IS GENERATED | PC001 |
| 11 | M001 | ALM20 | ABNORMAL SOUND IS GENERATED FROM MOTOR AND OVERCURRENT ALARM IS GENERATED | PM001 |
| 12 | M001 | ALM20 | OVERCURRENT ALARM IS GENERATED | PM001 |
| ... | ... | ... | ... | ... |

FIG. 8

| NUMBER | EVENT CODE | CNC ALARM | FEATURE | COUNTERMEASURE PART |
|---|---|---|---|---|
| 1 | T001 | NONE | TABLE (3), GRINDING SOUND (2), MOVEMENT IS POOR (1) | PT002(2), PT003 |
| 2 | B001 | NONE | MACHINING ACCURACY (3), RUMBLING SOUND (2), BACKLASH (1) | PB001(3), PB003(2) |
| 3 | C001 | ALM10 | OVERLOAD ALARM (2) | PC001(2) |
| 4 | M001 | ALM20 | ABNORMAL SOUND FROM MOTOR (1), OVERCURRENT ALARM (2) | PM001(2) |

FIG. 9

| NUMBER | EVENT CODE | FREQUENCY BAND | DETECTION LEVEL 1 (WARNING LEVEL) | DETECTION LEVEL 2 (FAILURE LEVEL) | CNC ALARM | FEATURE | COUNTERMEASURE PART |
|---|---|---|---|---|---|---|---|
| 1 | T001 | 30Hz~50Hz | 0.5dB | 0.8dB | NONE | TABLE (3), GRINDING SOUND (2), MOVEMENT IS POOR (1) | PT002(2), PT003 |
| 2 | B001 | 100Hz~150Hz | 0.4dB | 0.7dB | NONE | MACHINING ACCURACY (3), RUMBLING SOUND (2), BACKLASH (1) | PB001(3), PB003(2) |
| 3 | C001 | - | - | - | ALM10 | OVERLOAD ALARM (2) | PC001(2) |
| 4 | M001 | - | - | - | ALM20 | ABNORMAL SOUND FROM MOTOR (1), OVERCURRENT ALARM (2) | PM001(2) |

FAILURE LOCATION SPECIFYING DEVICE, FAILURE LOCATION SPECIFYING METHOD, AND FAILURE LOCATION SPECIFYING PROGRAM

This application is based on and claims the benefit of priority from Japanese Patent Application No. 2018-020741, filed on 8 Feb. 2018, the content of which is incorporated herein by reference.

BACKGROUND OF THE INVENTION

Field of the Invention

The present invention relates to a device, a method, and a program for specifying locations of failures in a machine.

Related Art

Conventionally, when a failure occurs in a machine such as a machine tool, a robot, or an injector molding machine, a controller (for example, a computerized numerical controller (CNC)) that controls the machine detects errors inside the controller or detects problems that occur in a mechanism unit of the machine on the basis of an overload or the like of a motor and outputs an alarm. This alarm information is useful in tracking failures and performs a role of clustering many causes of failures that occur.

For example, Patent Document 1 proposes a method of analyzing frequencies of disturbance torque in a servo motor having a reduction gear and comparing a peak value of a specific frequency component with a threshold to detect abnormalities in the reduction gear.

Patent Document 1: Japanese Patent No. 4112594

SUMMARY OF THE INVENTION

However, a controller may not detect some failures of a machine and may not generate an alarm. In this case, there are a number of locations which are regarded as the cause of a failure and it may take a considerable time in tracking the failure. Moreover, since the method of detecting a specific frequency component is specialized to a specific failure, it was difficult to specify locations of various failures.

An object of the present invention is to provide a failure location specifying device, a failure location specifying method, and a failure location specifying program capable of specifying locations of various failures occurring in a mechanism unit of a machine efficiently.

(1) A failure location specifying device (for example, a failure location specifying device 1 to be described later) according to the present invention includes: a storage unit (for example, a failure history database 21 to be described later) that stores a specific frequency band occurring resulting from a failure of a machine in correlation with at least an event code indicating a location of the failure; an input unit (for example, an input unit 15 to be described later) that receives data related to vibration during operation of the machine as an input; and an output unit (for example, an output unit 16 to be described later) that matches the specific frequency band to a frequency included in the data related to vibration to specify the location of the failure and outputs the event code.

In the failure location specifying device according to (1), the input unit may receive disturbance torque with respect to a command signal to the machine as the data related to vibration.

(3) The failure location specifying device according to (1) or (2) may further include: a failure unit acquiring unit (for example, a failure unit acquiring unit 12 to be described later) that acquires a data set in which the event code is correlated with one or a plurality of constituent parts; a failure history acquiring unit (for example, a failure history acquiring unit 11 to be described later) that acquires a failure history including events of failures occurred in the past and countermeasure parts; and a correlating unit (for example, a correlating unit 13 to be described later) that stores information on one or a plurality of events in correlation with the event code by matching the constituent part to the countermeasure part, wherein the specific frequency band is set on the basis of information on the event.

(4) in the failure location specifying device according to any one of (1) to (3), the input unit may receive the data related to vibration in a sampling period in which an operating state of the machine used as a condition.

(5) in the failure location specifying device according to any one of (1) to (4), the output unit may determine a plurality of failure levels corresponding to the event code using a plurality of thresholds related to amplitudes and outputs the failure levels.

(6) A failure location specifying method according to the present invention causes a computer (for example, a failure location specifying device 1 to be described later) to execute: a storing step of storing a specific frequency band occurring resulting from a failure of a machine in correlation with at least an event code indicating a location of the failure; an input step of receiving data related to vibration during operation of the machine as an input; and an output step of matching the specific frequency band to a frequency included in the data related to vibration to specify the location of the failure and outputting the event code.

(7) In the failure location specifying method according to (6), the input step may involve receiving the data related to vibration in a sampling period in which an operating state of the machine is used as a condition.

(8) in the failure location specifying method according to (6) or (7), the output step may involve determining a plurality of failure levels corresponding to the event code using a plurality of thresholds related to amplitudes and outputs the failure levels.

(9) A failure location specifying program according to the present invention causes a computer (for example, a failure location specifying device 1 to be described later) to execute: a storing step of storing a specific frequency band occurring resulting from a failure of a machine in correlation with at least an event code indicating a location of the failure; an input step of receiving data related to vibration during operation of the machine as an input; and an output step of matching the specific frequency band to a frequency included in the data related to vibration to specify the location of the failure and outputting the event code.

(10) In the failure location specifying program according to (9), the input step may involve receiving the data related to vibration in a sampling period in which an operating state of the machine is used as a condition.

(11) In the failure location specifying program according to (9) or (10), the output step may involve determining a plurality of failure levels corresponding to the event code using a plurality of thresholds related to amplitudes and outputting the failure levels.

According to the present invention, it is possible to specify locations of various failures occurring in a mechanism unit of a machine efficiently.

DETAILED DESCRIPTION OF THE INVENTION

Figure 1:
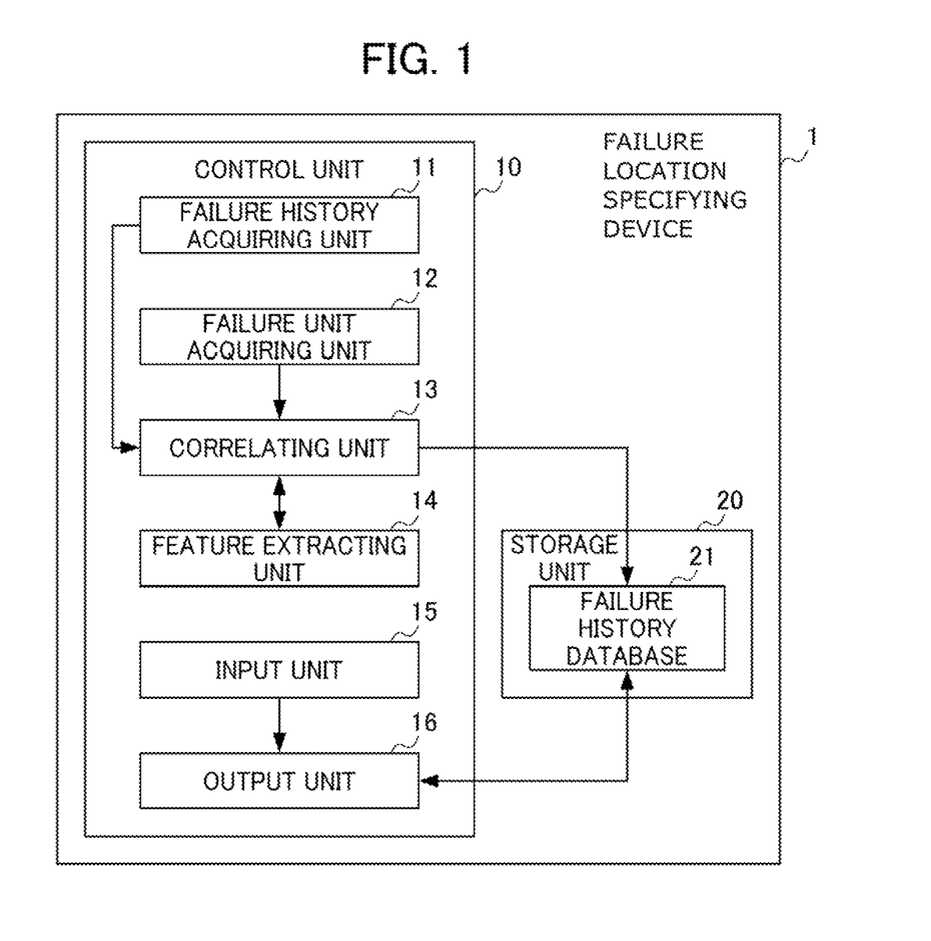
FIG. 1 is a block diagram illustrating a functional configuration of a failure location specifying device according to an embodiment.

Hereinafter, an example of an embodiment of the present invention will be described. FIG. 1 is a block diagram illustrating a functional configuration of a failure location specifying device 1 according to the present embodiment.

The failure location specifying device 1 is an information processing device (computer) such as a server device or a PC and includes a control unit 10 and a storage unit 20. The failure location specifying device 1 further includes various data input/output devices, a communication device, and the like, and outputs information on specified failure locations on the basis of a database of the storage unit 20 using observation data during operation of the machine as an input.

The control unit 10 is a part that controls the entire failure location specifying device 1 and realizes various functions of the present embodiment by reading and executing various programs stored in the storage unit 20 appropriately. The control unit 10 may be a CPU.

The storage unit 20 is a storage area for various programs for causing a hardware group to function as the failure location specifying device 1 and various pieces of data and may be a ROM, a RAM, a flash memory, or a hard disk drive (HDD). Specifically, the storage unit 20 stores a failure history database 21 and the like constructed as a retrieval target in addition to a failure location specifying program for causing the control unit 10 to execute various functions of the present embodiment. The failure history database 21 is provided outside the failure location specifying device 1 and may read and write data by communicating with the failure location specifying device 1.

The control unit 10 includes a failure history acquiring unit 11, a failure unit acquiring unit 12, a correlating unit 13, a feature extracting unit 14, an input unit 15, and an output unit 16. The control unit 10 specifies failure locations of the machine which is an observation target with the aid of these functional units.

Figure 2:
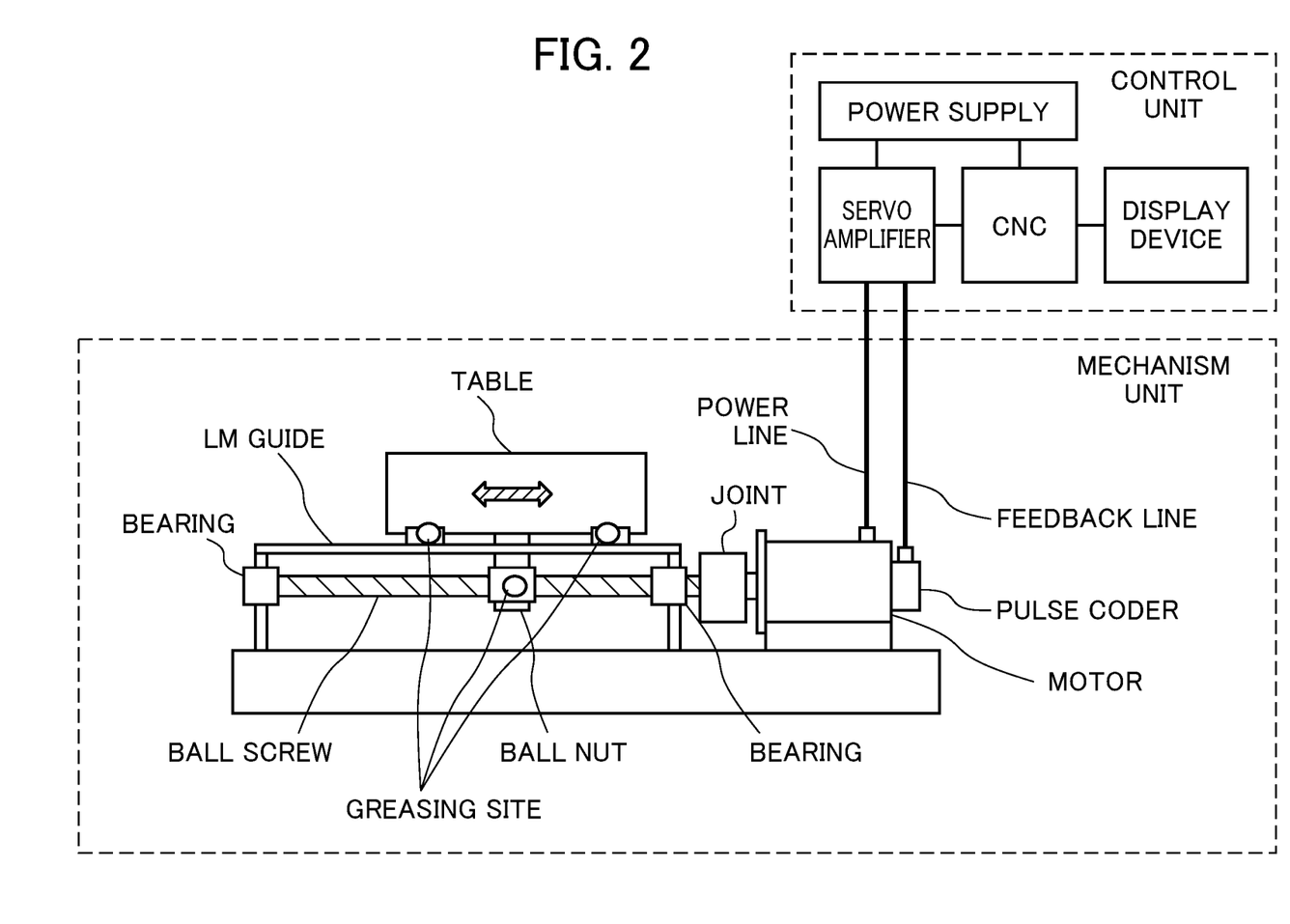
FIG. 2 is a diagram illustrating a configuration example of a machine which is an observation target of a failure location specifying method according to an embodiment.

FIG. 2 is a diagram illustrating a configuration example of a machine which is an observation target of a failure location specifying method according to the present embodiment. A machine is classified into a control unit and a mechanism unit, and the control unit displays an alarm number and the content of an alarm detected by a controller (CNC) on a display device to inform an operator of a situation. Moreover, as for failures that occur in the mechanism unit, a controller monitors a situation of a motor of the mechanism unit driven by a servo amplifier and outputs an overcurrent alarm, an overload alarm, or the like for the motor.

However, although an alarm may be output for failures which cause a serious problem in operations of a machine, since dynamic power is transmitted indirectly from the motor to respective portions of the mechanism unit, it may often be difficult to detect failures that occur in the mechanism unit on the basis of a feedback from the motor. In this case, an operator finds out vibration, abnormal noise, and the like generated in the mechanism unit and searches for failure locations by checking respective elements of the machine one by one.

The failure history acquiring unit 11 acquires a failure history including various failure events that have occurred in the machine in the past and countermeasure parts.

Figure 3:
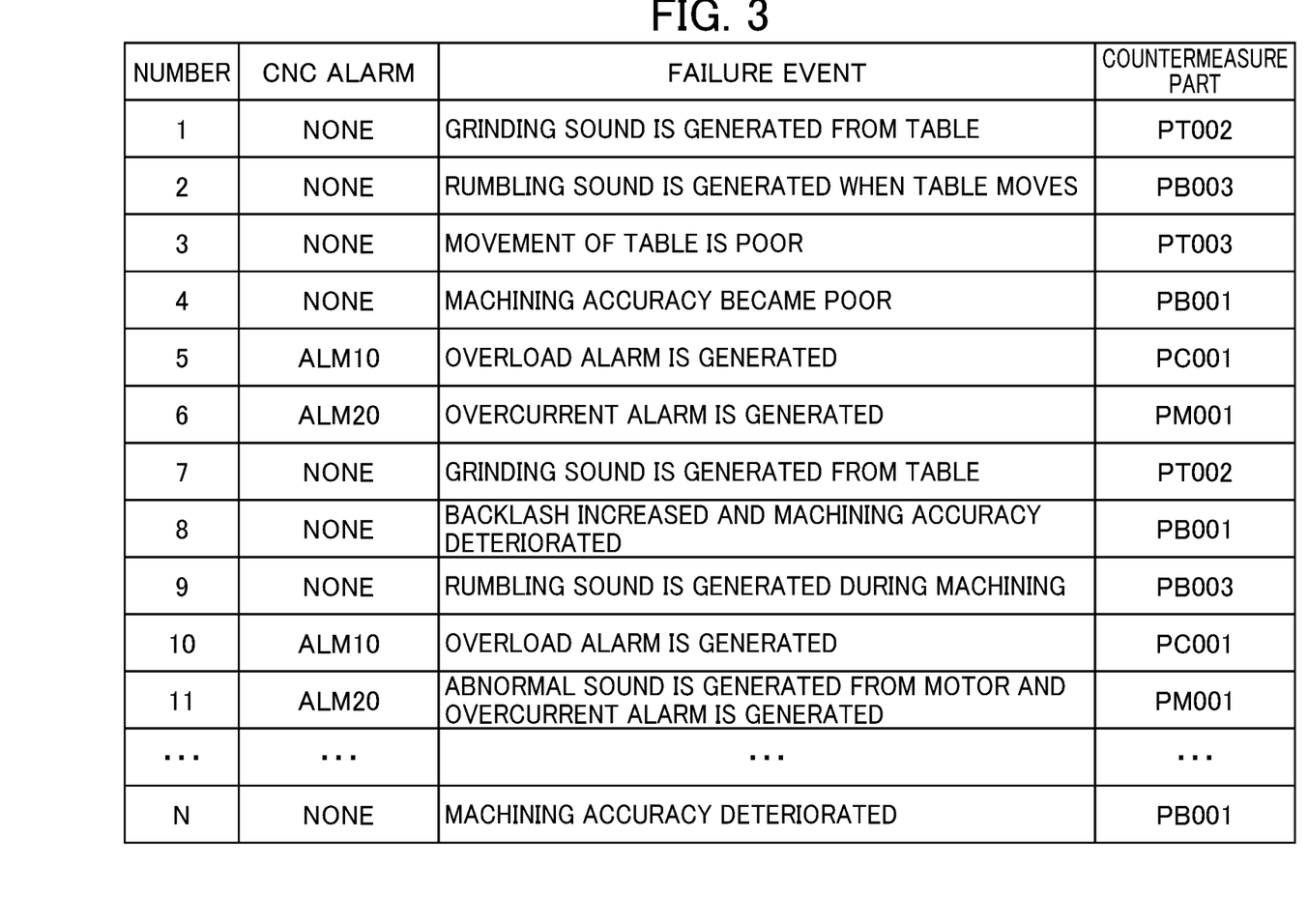
FIG. 3 is a diagram illustrating an example of failure history data according to an embodiment.

FIG. 3 is a diagram illustrating an example of failure history data according to the present embodiment. In the failure history data, for example, a description "grinding sound is generated from the vicinity of a table" describing the event of a failure that occurred in the past is correlated with the number of a countermeasure part for eliminating the failure. In this example, an alarm number is recorded when the controller (CNC) outputs an alarm with respect to the occurred failure.

The failure unit acquiring unit 12 acquires a data set in which a failure unit of a machine is correlated with one or a plurality of constituent parts. A failure unit is a unit in which a failure occurring in the mechanism unit of a machine is examined and countermeasures thereof are taken, and a plurality of failure units made up of one or a plurality of constituent parts of which the causes of a failure cannot be separated is set when a machine is designed.

Figure 4:
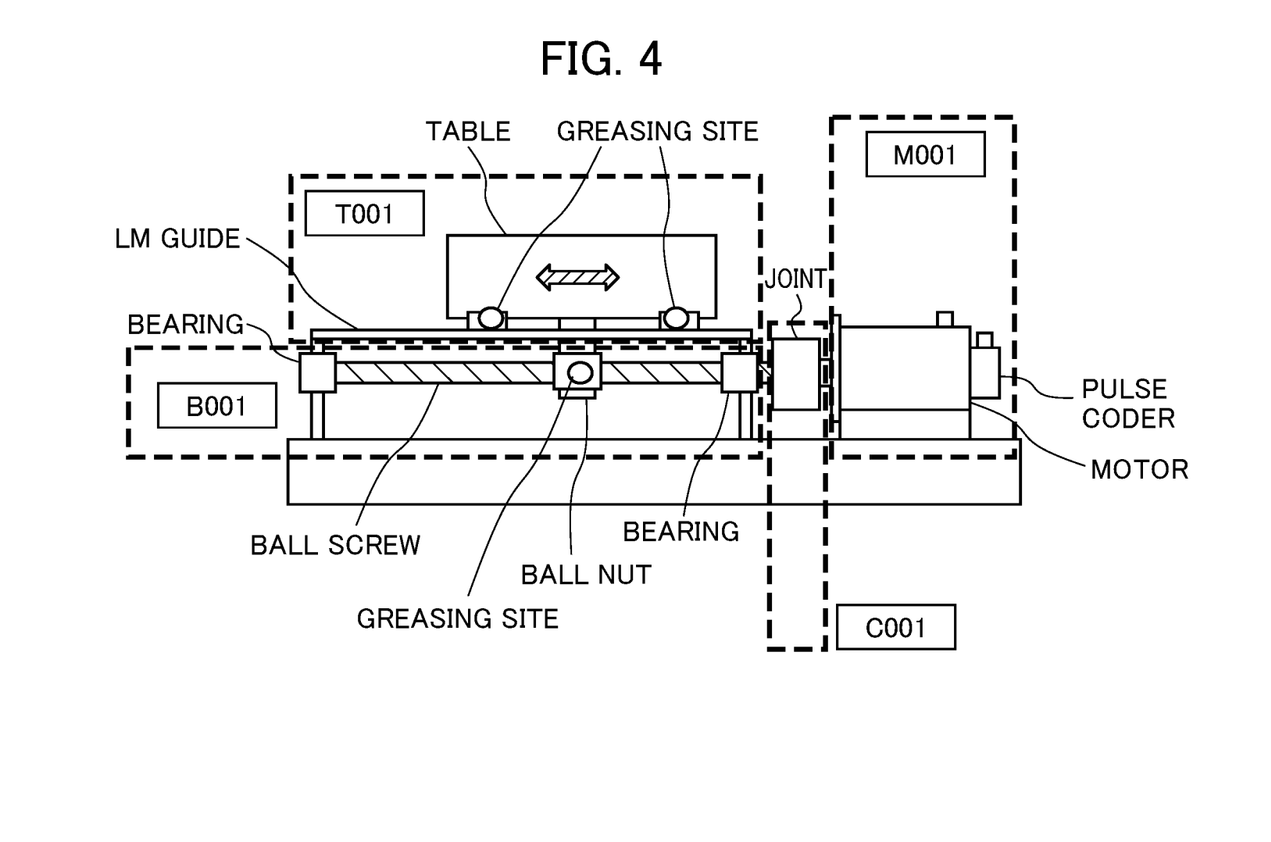
FIG. 4 is a diagram illustrating a definition example of a failure unit according to an embodiment.

FIG. 4 is a diagram illustrating a definition example of a failure unit according to the present embodiment. For example, a mechanism unit of a machine tool is divided into the following failure units.

M001: location including a motor that drives a machine tool, a pulse coder that gives feedback on a rotating position of the motor, and the like.

C001: location including a joint or the like which is a connection portion for transmitting dynamic power from a motor to a ball screw or the like.

B001: location including greasing spots to which grease is supplied automatically or manually, or the like in addition to a ball screw, a ball nut, and a bearing driven by a motor via a joint in order to align a table.

T001: location including greasing spots to which grease is supplied automatically or manually, or the like in addition to a table and a linear motion guide (LM guide).

Figure 5:
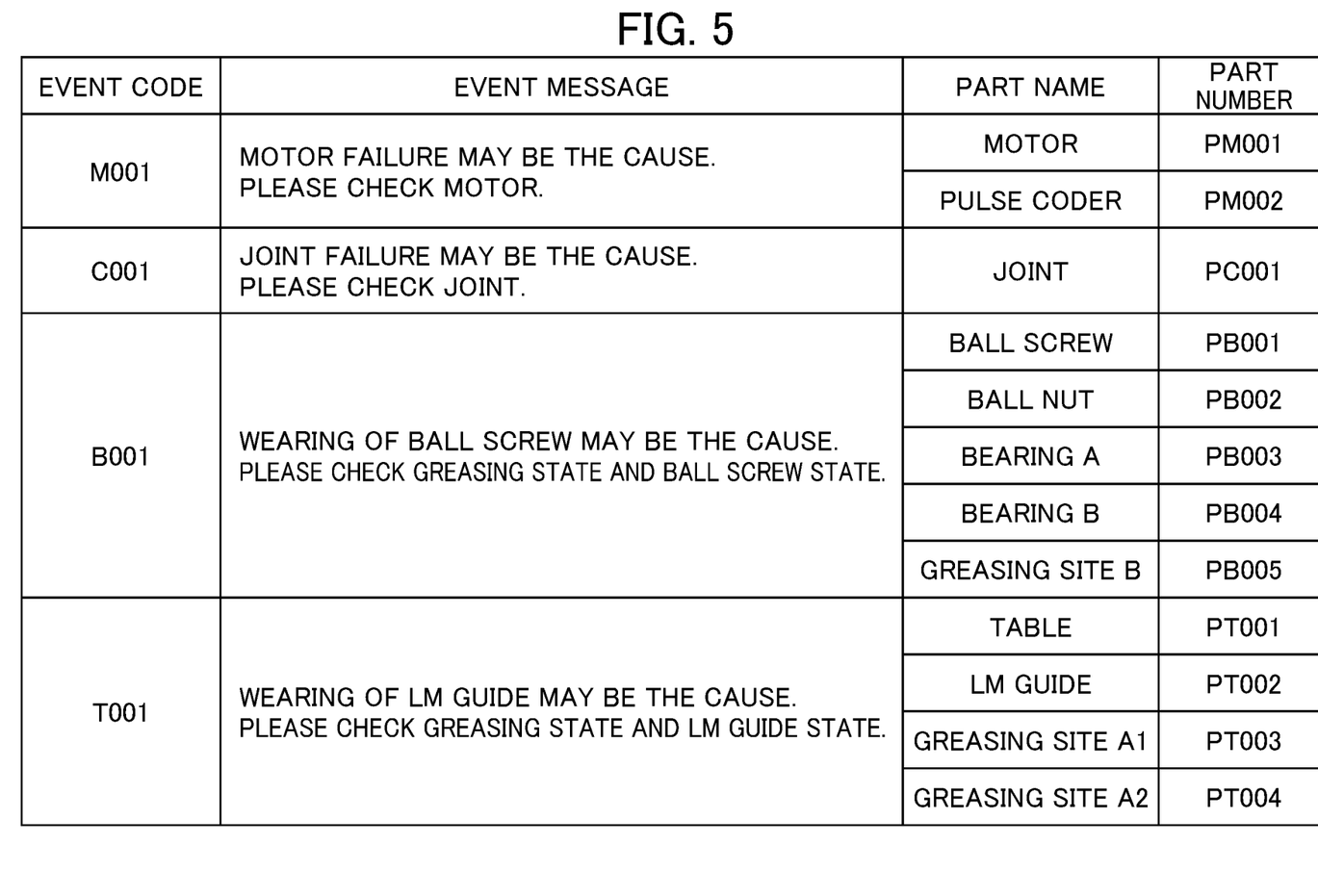
FIG. 5 is a diagram illustrating an example of a data set that defines a failure unit according to an embodiment.

FIG. 5 is a diagram illustrating an example of a data set that defines a failure unit according to the present embodiment. In a data set, a part number and a part name that form a failure unit are registered with respect to an event code which is an identifier indicating the failure unit. In this example, an event message for notifying of the causes of a failure, a countermeasure procedure, and the like is registered for each event code.

The correlating unit 13 matches a constituent part correlated with an event code with a countermeasure part of a failure history and stores information on one or a plurality of events in the failure history database 21 of the storage unit 20 in correlation with the event code (the failure unit).

Figure 6:
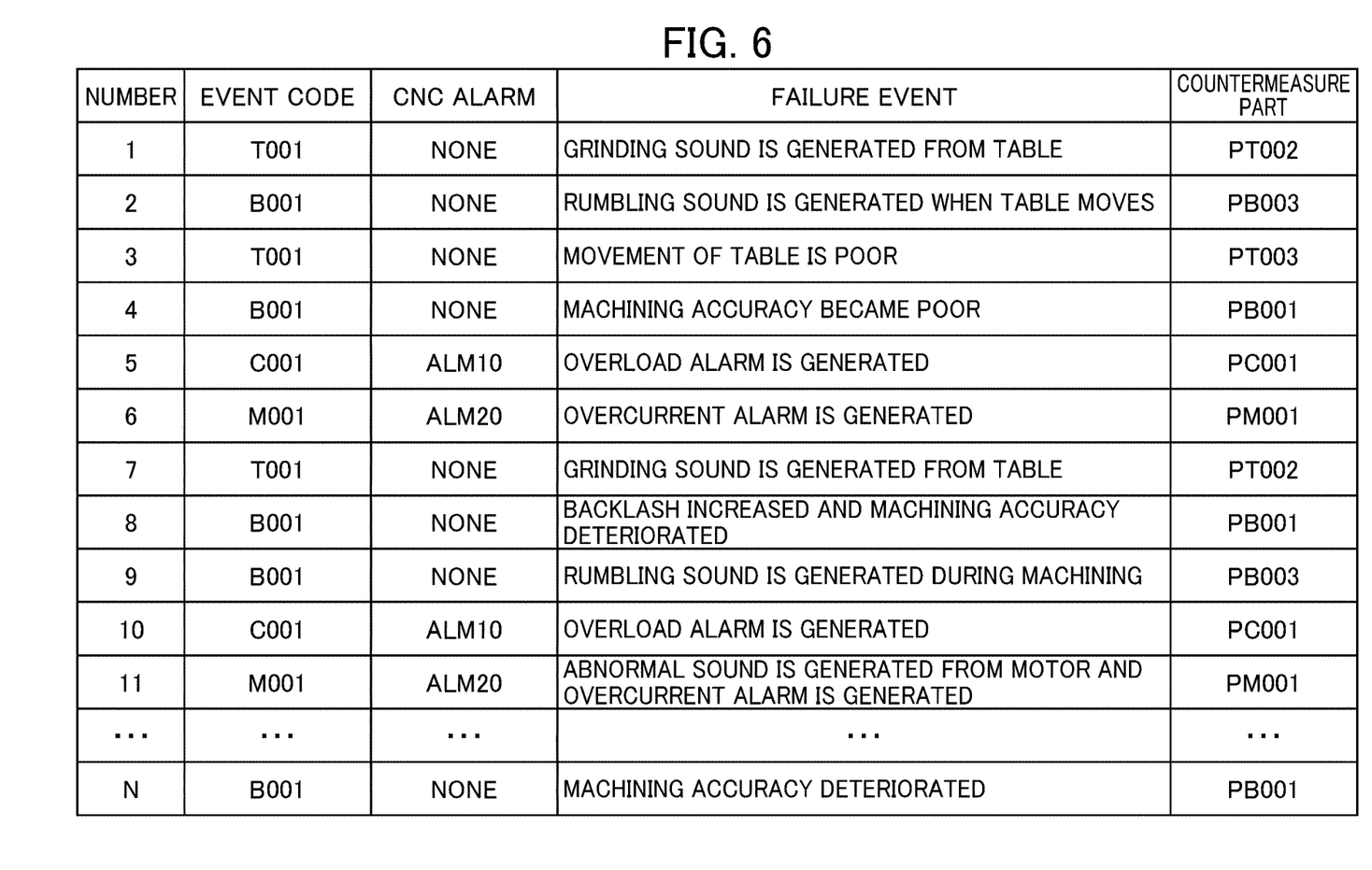
FIG. 6 is a diagram illustrating an example of a failure history database to which an event code according to an embodiment is appended.

FIG. 6 is a diagram illustrating an example of a failure history database 21 to which an event code according to the present embodiment is appended. In this example, an event code is appended to each piece of failure history data illustrated in FIG. 3. With this failure history database 21, an event code can be specified on the basis of an event or an alarm of a failure, and the failure unit is specified.

Here, the format of the failure history database 21 is not limited thereto, and variations for realizing efficient retrieval can be made. The correlating unit 13 may store one or a plurality of pieces of feature data indicating a failure event in the failure history database 21 in correlation with one event code.

The feature extracting unit 14 extracts a failure keyword included in event information as feature data of each event code correlated by the correlating unit 13. Here, the failure keyword extraction method is not limited, and a method which uses morpheme analysis proposed in Japanese Patent Application No. 2017-159990, for example, can be used. In this case, failure keywords may be determined by referring to various databases of unnecessary words excluded from extraction targets as well as synonyms (from a thesaurus) classified as having the same meaning.

Figure 7:
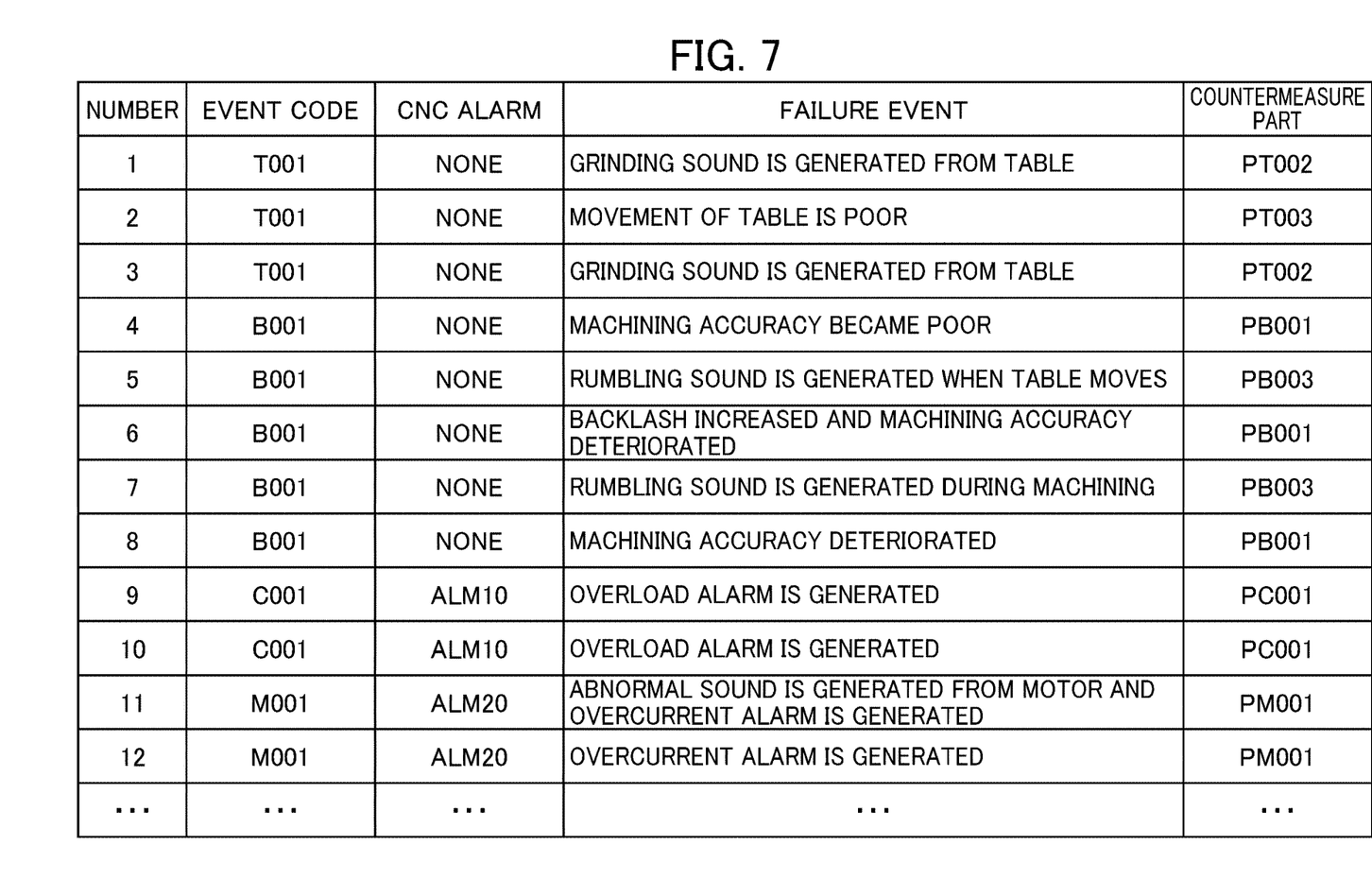
FIG. 7 illustrates an example in which a failure history database according to an embodiment is sorted by an event code.

FIG. 7 illustrates an example in which the failure history database 21 according to the present embodiment is sorted by an event code. In this manner, a plurality of pieces of event information and countermeasure parts are correlated with the same event code.

Figure 8:
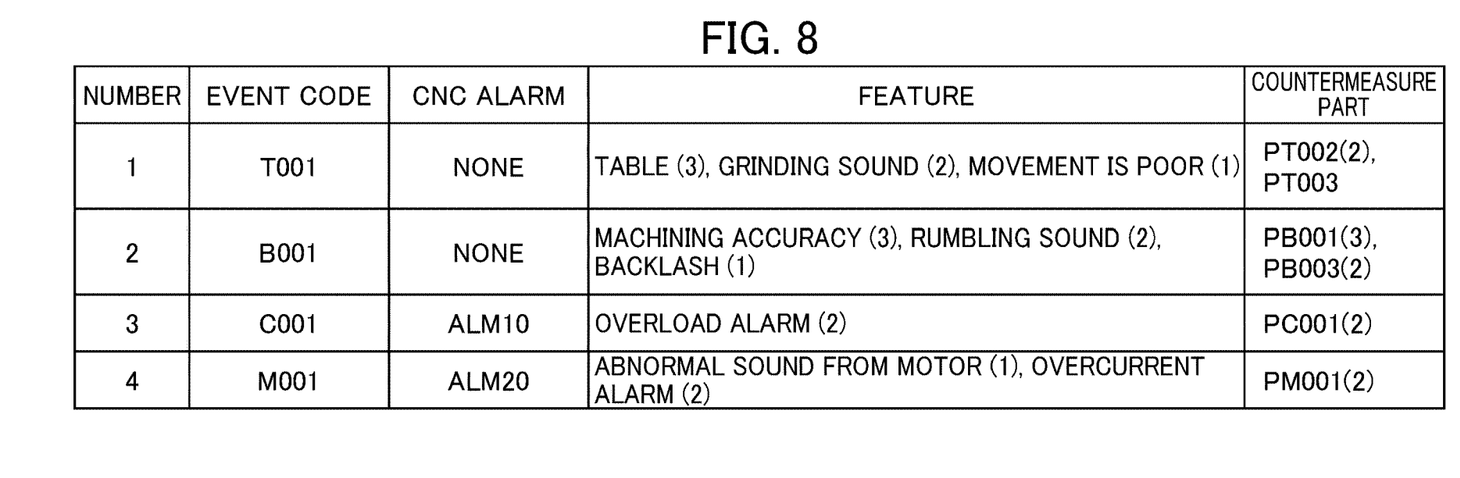
FIG. 8 is a diagram illustrating an example of a failure history database based on feature data according to an embodiment.

FIG. 8 is a diagram illustrating an example of the failure history database 21 based on feature data according to the present embodiment. A failure keyword is extracted by the feature extracting unit 14 from a description of an event correlated with an event code, and the failure keyword is stored in the failure history database 21 as feature dada indicating the event. Here, the number assigned to a failure keyword and a countermeasure part in the drawing indicate the number of occurrences in a failure history having the same event code.

The failure keyword which is event information often includes onomatopoeia such as "grinding sound" or "rumbling sound". Sounds described by the onomatopoeia can be reproduced using a corresponding portion of a machine in a laboratory. The frequency of the reproduced sound is stored as a specific frequency band generated resulting from a failure in respective portions of the mechanism unit in correlation with the event code.

Figure 9:
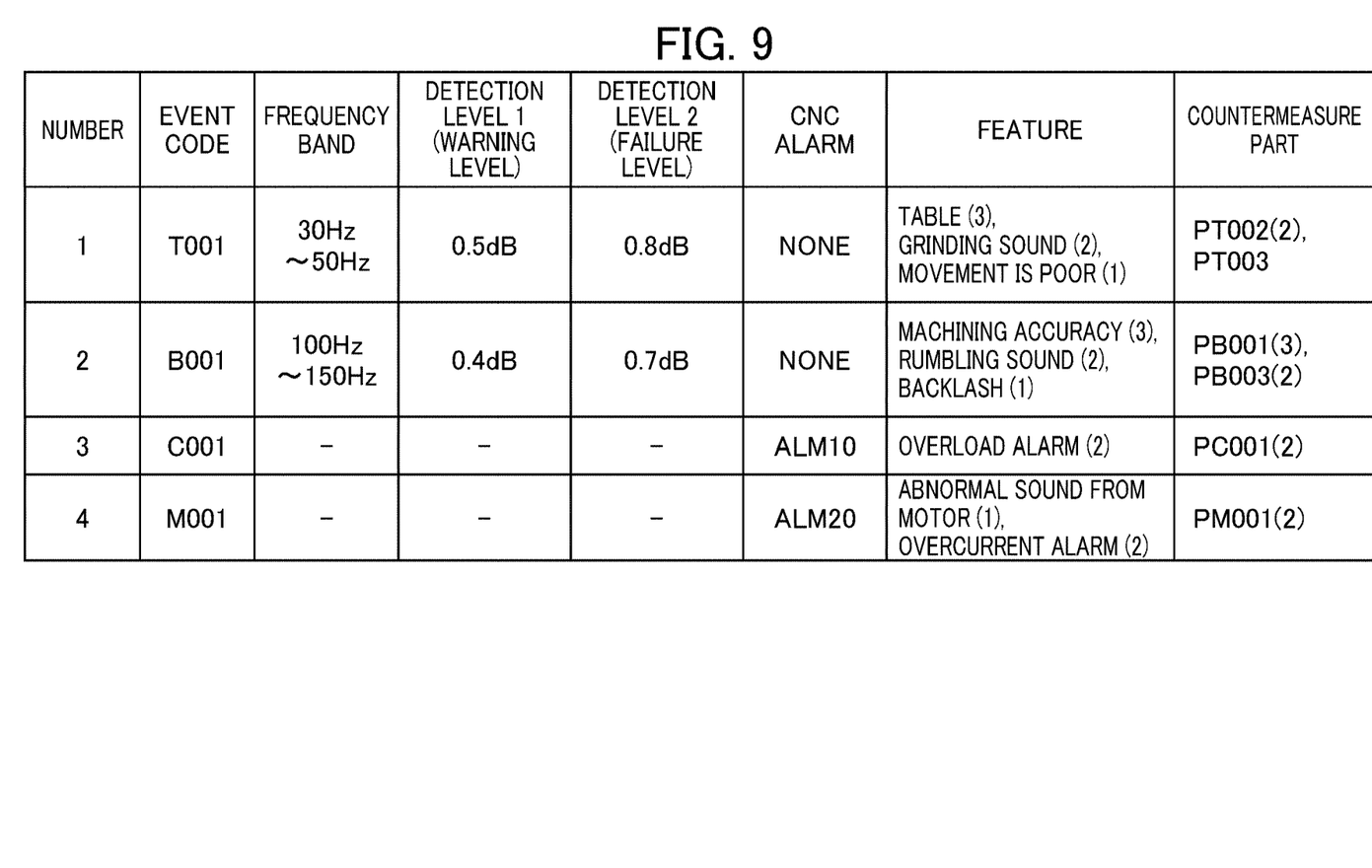
FIG. 9 is a diagram illustrating an example of a failure history database in which a specific frequency band according to an embodiment.

FIG. 9 is a diagram illustrating an example of the failure history database 21 in which a specific frequency band according to the present embodiment is set. For example, ranges of corresponding specific frequency bands (for example, 30 Hz to 50 Hz and 100 Hz to 150 Hz) are set to onomatopoeia of "grinding sound" and "rumbling sound" for event codes T001 and B001, respectively. The specific frequency band may be different depending on machining conditions such as a configuration of a machine or a rotation speed of a motor.

The input unit 15 receives data related to vibration during machining of a machine as an input. Specifically, the input unit 15 receives time-series data of disturbance torque for a command signal to the motor of a machine, for example, as data related to vibration. The disturbance torque is estimated on the basis of a torque command value and a speed feedback, for example, as a load different from a normal torque generated resulting from failures of a mechanism unit. Moreover, the input unit 15 may receive disturbance torque with respect to a command signal to a selected machine as the data related to vibration when operation data such as a present position of a machine is designated.

The output unit 16 specifies the location of a failure to output an event code by matching the frequency included in the acquired data related to vibration to a specific frequency band set in advance in the failure history database 21. In this case, the output unit 16 analyzes the frequency of the disturbance torque (by Fourier analysis) and outputs an event code correlated with the specific frequency band when an amplitude of a component of the specific frequency band exceeds a predetermined threshold. Furthermore, the output unit 16 may output an event message corresponding to the event code from the definition of the failure unit illustrated in FIG. 5.

A plurality of thresholds can be set. In this way, the level of failures can be classified into a warning level in which a machine does not operate normally but a failure has not occurred and a failure level in which a failure is likely to have occurred in a machine, for example. For example, in FIG. 9, amplitudes (dB) which are thresholds are set to determine detection level 1 (warning level) and detection level 2 (failure level).

Figure 10:
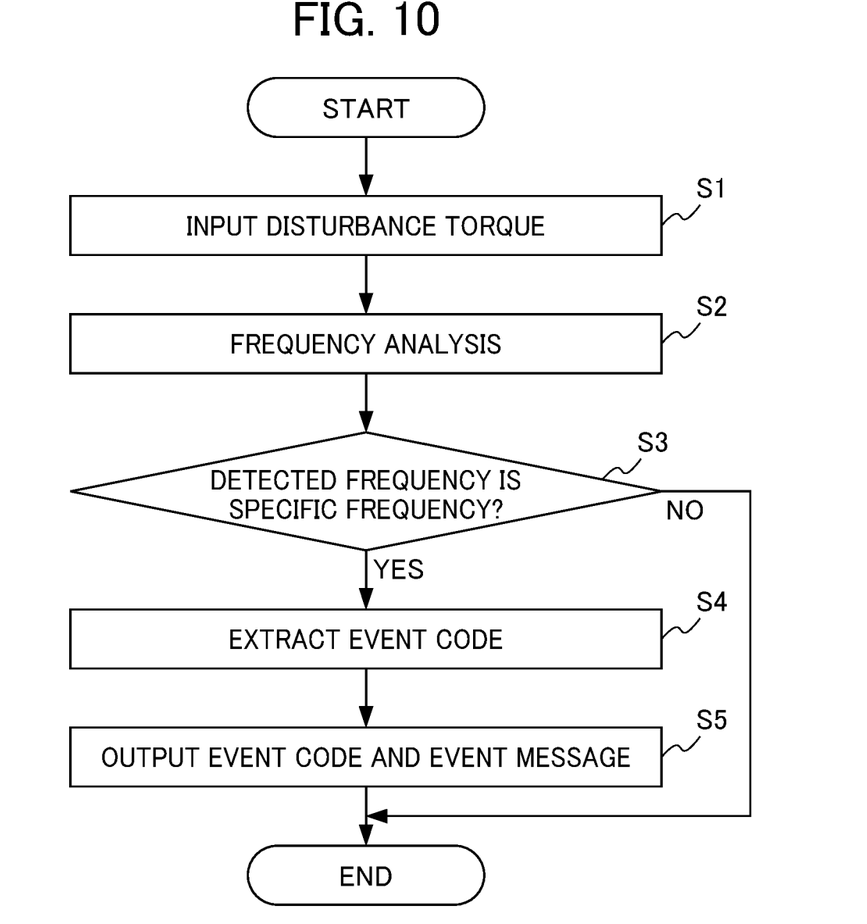
FIG. 10 is a flowchart illustrating an example of a failure location specifying process of a failure location specifying device according to an embodiment.

FIG. 10 is a flowchart illustrating an example of a failure location specifying process of the failure location specifying device 1 according to the present embodiment.

In step S1, the input unit 15 receives the input of time-series data of disturbance torque as the data related to vibration from a machine. The sampling range of the data may be limited using operation data of a machine such as position information by a method illustrated in FIG. 11, for example.

In step S2, the output unit 16 performs frequency analysis such as FFT (Fast Fourier Transform) with respect to the time-series data of the disturbance torque to detect frequency components having amplitudes exceeding the threshold.

In step S3, the output unit 16 determines whether the frequency detected in step S2 is registered as the specific frequency band in the failure history database 21. The flow proceeds to step S4 when a determination result of YES is obtained, and the flow ends when a determination result of NO is obtained.

In step S4, the output unit 16 extracts an event code of which the specific frequency band includes the detected frequency from the failure history database 21.

In step S5, the output unit 16 outputs the extracted event code and an event message corresponding to the event code.

Figure 11:
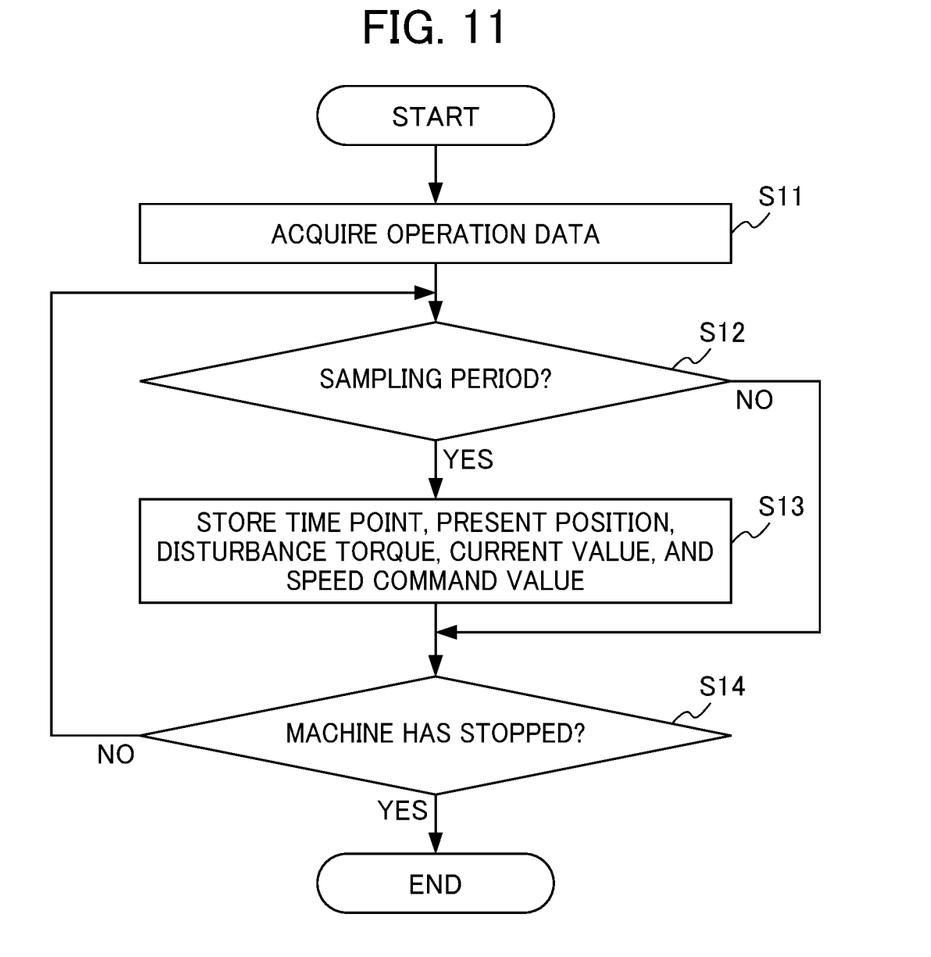
FIG. 11 is a flowchart illustrating an example of a method of extracting data related to vibration input in a failure location specifying process according to an embodiment.

FIG. 11 is a flowchart illustrating an example of a method) of extracting the data related to vibration input in the failure location specifying process according to the present embodiment. This process is preferably executed at a cycle of approximately 1 msec or shorter. In this way, it is possible to detect frequency components of several tens to several hundreds of Hz, for example, from the extracted data related to vibration.

In step S11, the input unit 15 acquires operation data such as the present position of a machine which is a monitoring target.

In step S12, the input unit 15 determines whether the acquired operation data satisfies predetermined conditions and whether a present time is in a sampling period of the data related to vibration. The flow proceeds to step S13 when a determination result of YES is obtained, and the flow proceeds to step S14 when a determination result of NO is obtained.

In step S13, the input unit 15 stores various pieces of data such as a present time point, a present position, a current value, and a speed command value other than the disturbance torque as the data related to vibration.

In step S14, the input unit 15 determines whether the monitoring target machine has stopped. The flow ends when a determination result of YES is obtained and the flow returns to step S12 when a determination result of NO is obtained.

According to the present embodiment, the failure location specifying device 1 stores a specific frequency band occurring resulting from a failure in the failure history database 21 in advance in correlation with the event code indicating the location of a failure. The failure location specifying device 1 specifies a location of a failure by matching a frequency detected from the data related to vibration during operation of a machine to a specific frequency band of the failure history database 21 and outputs an event code. Therefore, the failure location specifying device 1 can specify various sounds registered as a failure history on the basis of the specific frequency band included in the vibration of a machine to thereby specify the locations of various failures in a mechanism unit of a machine efficiently and accurately. As a result, it is easy to specify failure locations and the time required for tracking failures shortened.

Since the failure location specifying device 1 acquires disturbance torque with respect to a command signal to a machine as data related to vibration, a special vibration sensor is not necessary, and it is possible to acquire vibration transmitted to a motor efficiently with a simple configuration and to specify failure locations.

The failure location specifying device 1 acquires a data set in which an event code is correlated with a constituent part and a failure history in which an event of a failure is correlated with a countermeasure part and correlates event information with an event code by matching the constituent part to the countermeasure part. In this way, since the failure location specifying device 1 can cluster events of a failure history in event codes which are failure units, it is possible to easily set the specific frequency band by extracting onomatopoeia and the like from the classified failure events.

Since the failure location specifying device 1 can use disturbance torque with respect to a selected command signal when operation data such as a present position of a machine is designated, vibration can be measured at the pinpoint, timings at which failures occur, and the accuracy of specifying failure locations is improved.

While embodiments of the present invention have been described above, the present invention is not limited to the above-described embodiments. Moreover, the advantageous effects described in the embodiments of the present invention are only exemplary ones of the most preferable effects produced by the present invention, and therefore, the advantageous effects of the present invention are not limited to those described in the embodiments of the present invention.

The failure location specifying method by the failure location specifying device 1 is realized by software. When the failure location specifying method is realized by software, programs that form the software are installed on a computer (the failure location specifying device 1). Moreover, these programs may be recorded on a removable medium and distributed to users and may be distributed by being downloaded to a computer of a user via a network.

EXPLANATION OF REFERENCE NUMERALS

1: Failure location specifying device
10: Control unit
11: Failure history acquiring unit
12: Failure unit acquiring unit
13: Correlating unit
14: Feature extracting unit
15: Input unit
16: Output unit
20: Storage unit
21: Failure history database

What is claimed is:

1. A failure location specifying device comprising:
a non-transitory memory; and
a processor that:
acquires a failure history including (i) events of failures that have previously occurred and (ii) countermeasure parts for eliminating the events of failures that have previously occurred;
acquires a data set in which an event code indicating the location of a failure in a machine is correlated with one or more part numbers of the machine;
stores, in the non-transitory memory, information on one or a plurality of events of failure in correlation with the event code by matching (i) a part number from among the one or more part numbers of the machine correlated with the event code in the acquired data set to (ii) a countermeasure part from among the countermeasure parts in the acquired failure history;
(i) based on the information on the one or the plurality of events of failure in correlation with the event code, set a specific frequency band to a frequency range of sound occurring resulting from the failure of the machine at the location of the failure of the machine indicated by the event code, and (ii) store, in the non-transitory memory, the specific frequency band in correlation with the event code;
receives data related to vibration during operation of the machine as an input; and
matches the specific frequency band to a frequency included in the data related to vibration to specify the location of the failure in the machine, and outputs the event code indicating the location of the failure in the machine.

2. The failure location specifying device according to claim 1, wherein
the data related to the vibration received by the processor is a disturbance torque, the disturbance torque being received with respect to a command signal to the machine.

3. The failure location specifying device according to claim 1, wherein
the processor receives the data related to vibration in a sampling period in which an operating state of the machine is used as a condition.

4. The failure location specifying device according to claim 1, wherein
the processor determines a plurality of failure levels corresponding to the event code indicating the location of the failure in the machine using a plurality of thresholds related to amplitudes, and the processor outputs the failure levels.

5. A failure location specifying method for causing a computer to execute:
acquiring a failure history including (i) events of failures that have previously occurred and (ii) countermeasure parts for eliminating the events of failures that have previously occurred;
acquiring a data set in which an event code indicating the location of a failure in a machine is correlated with one or more part numbers of the machine;
storing information on one or a plurality of events of failure in correlation with the event code by matching (i) a part number from among the one or more part numbers of the machine correlated with the event code in the acquired data set to (ii) a countermeasure part from among the countermeasure parts in the acquired failure history;
(i) based on the information on the one or the plurality of events of failure in correlation with the event code, setting a specific frequency band to a frequency range of sound occurring resulting from the failure of the machine at the location of the failure of the machine indicated by the event code, and (ii) storing the specific frequency band in correlation with the event code;
receiving data related to vibration during operation of the machine as an input; and
matching the specific frequency band to a frequency included in the data related to vibration to specify the location of the failure of the machine, and outputting the event code indicating the location of the failure in the machine.

6. The failure location specifying method according to claim 5, wherein
the data related to vibration during operation of the machine is received in a sampling period in which an operating state of the machine is used as a condition.

7. The failure location specifying method according to claim 5, further comprising
determining a plurality of failure levels corresponding to the event code indicating the location of the failure in the machine using a plurality of thresholds related to amplitudes, and outputting the failure levels.

8. A non-transitory computer readable medium having a failure location specifying program recorded thereon, the failure location specifying program causing a computer to execute:
acquiring a failure history including (i) events of failures that have previously occurred and (ii) countermeasure parts for eliminating the events of failures that have previously occurred;
acquiring a data set in which an event code indicating the location of a failure in a machine is correlated with one or more part numbers of the machine;
storing information on one or a plurality of events of failure in correlation with the event code by matching (i) a part number from among the one or more part numbers of the machine correlated with the event code in the acquired data set to (ii) a countermeasure part from among the countermeasure parts in the acquired failure history;
(i) based on the information on the one or the plurality of events of failure in correlation with the event code, setting a specific frequency band to a frequency range of sound occurring resulting from the failure of the machine at the location of the failure of the machine indicated by the event code, and (ii) storing the specific frequency band in correlation with the event code;
receiving data related to vibration during operation of the machine as an input; and
matching the specific frequency band to a frequency included in the data related to vibration to specify the location of the failure and outputting the event code indicating the location of the failure of the machine.

9. The non-transitory computer readable medium according to claim 8, wherein
the data related to vibration during operation of the machine is received in a sampling period in which an operating state of the machine is used as a condition.

10. The non-transitory computer readable medium according to claim 8, further comprising
determining a plurality of failure levels corresponding to the event code indicating the location of the failure in the machine using a plurality of thresholds related to amplitudes, and outputting the failure levels.

* * * * *